(12) United States Patent
Okanaka et al.

(10) Patent No.: US 7,100,910 B2
(45) Date of Patent: Sep. 5, 2006

(54) FLUID-FILLED VIBRATION DAMPING MOUNT

(75) Inventors: Takehiro Okanaka, Kasugai (JP); Tetsuji Andou, Inuyama (JP); Shigeki Hama, Okazaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/797,786

(22) Filed: Mar. 9, 2004

(65) Prior Publication Data

US 2004/0188902 A1 Sep. 30, 2004

(30) Foreign Application Priority Data

Mar. 12, 2003 (JP) .............................. 2003-066123

(51) Int. Cl.
*F16M 5/00* (2006.01)
(52) U.S. Cl. ................................................. 267/140.13
(58) Field of Classification Search . 267/140.11–141.7
See application file for complete search history.

(56) References Cited

U.S. PATENT DOCUMENTS

| | | | | |
|---|---|---|---|---|
| 4,763,884 A | * | 8/1988 | Matsui et al. ........... | 267/140.12 |
| 4,779,585 A | | 10/1988 | Behrens et al. | |
| 4,971,456 A | * | 11/1990 | Hori ...................... | 384/99 |
| 4,997,168 A | * | 3/1991 | Kato ...................... | 267/140.13 |
| 5,080,330 A | * | 1/1992 | Nanno .................... | 267/140.12 |
| 5,190,269 A | * | 3/1993 | Ikeda et al. ............. | 267/140.12 |
| 5,259,598 A | * | 11/1993 | Hibi et al. .............. | 267/140.13 |
| 5,269,498 A | * | 12/1993 | Bretaudeau et al. ...  | 267/140.13 |
| 6,390,458 B1 | * | 5/2002 | Okanaka et al. ........ | 267/140.11 |
| 6,523,814 B1 | * | 2/2003 | Kodama et al. ........ | 267/140.13 |
| 6,799,753 B1 | * | 10/2004 | Okanaka et al. ........ | 267/140.13 |
| 2003/0075848 A1 | | 4/2003 | Okanaka et al. | |

FOREIGN PATENT DOCUMENTS

| | | | |
|---|---|---|---|
| JP | 63-167142 | | 7/1988 |
| JP | 7-180743 | | 7/1995 |
| JP | 8-145113 | | 6/1996 |
| JP | 2548050 | | 8/1996 |
| JP | 200065121 | * | 3/2000 |

* cited by examiner

*Primary Examiner*—Christopher P. Schwartz
(74) *Attorney, Agent, or Firm*—Beyer Weaver & Thomas LLP

(57) ABSTRACT

A fluid-filled vibration-damping mount of suspension type, wherein a lower open-end of a second mounting member is fluid-tightly closed by a first mounting member and a tapered elastic body interposed therebetween. An upper open-end portion of the cylindrical portion is closed by a flexible layer for forming a fluid chamber between the elastic body and the flexible layer, which is divided by a partition member into a pressure-receiving chamber defined by the elastic body and an equilibrium chamber defined by the flexible layer, which are mutually communicated through an orifice passage. A pair of elastic restricting projections bonded to the partition member at respective circumferential positions with a circumferential length smaller than a half of a circumference of the partition member, project toward a circumferential region defined between the elastic body and the second mount member, for narrowing the region.

11 Claims, 8 Drawing Sheets

VEHICLE DRIVING DIRECTION

PRIOR ART

FLUID-FILLED VIBRATION DAMPING MOUNT

INCORPORATED BY REFERENCE

The disclosure of Japanese Patent Applications No. 2003-066123 filed on Mar. 12, 2003, including the specification, drawings and abstract, is incorporated herein by reference in its entirety.

BACKGROUND OF THE INVENTION

1. Field of the Invention

The present invention relates generally to a fluid-filled vibration damping mount adapted to exhibit a vibration-damping effect on the basis of flow of a fluid sealed therein, and more particularly to such a fluid-filled vibration damping mount that is novel in construction and suitable for use as an engine mount, a body mount or other mounts for use in automotive vehicles.

2. Description of the Related Art

A suspension-type fluid-filled vibration damping mount is known as one type of fluid-filled vibration damping mounts each interposed between two members of a vibration system for flexibly connecting these two members in a vibration-damping or isolating fashion. As disclosed in JP-A-63-167142 and JP-B-2548050, the known suspension-type fluid-filled vibration damping mount elastically supports a vibrative member, e.g., a power unit of an automotive vehicle, with respect to a subject member, e.g., a body of the vehicle, whose vibration is to be damped by suspending the vibrative member from the subject member. FIG. 15 shows an example of the known suspension-type fluid-filled vibration damping mount, by way of example, in which a first mounting member 150 attachable to the power unit and a second mounting member 152 attachable to the body are elastically connected with each other by a tapered rubber elastic body 156 disposed between the first mounting member and a lower open-end portion of a vertically extending cylindrical portion 154 of the second mounting member 152 into which the first mounting member 150 is inserted so as to extend into the cylindrical portion 154 for fluid-tightly closing the lower open-end portion of the cylindrical portion 154 of the second mounting member 152. An axially upper end portion of the cylindrical portion 154 of the second mounting member 152 is fluid-tightly closed by a flexible layer 158, whereby a fluid chamber 160 is formed between and defined by the rubber elastic body 156 and the flexible layer 158. Within the fluid chamber 160, is disposed a partition member 162 extending in a diametric direction perpendicular to an axial direction of the cylindrical portion 154 of the second mounting member 152, while being supported at its peripheral portion by the second mounting member 152. With this arrangement, the fluid chamber 160 is fluid-tightly divided by the partition member 162 into two sections, i.e., a pressure-receiving chamber 164 partially defined by the rubber elastic body 156 and an equilibrium chamber 166 partially defined by the flexible layer 158. The pressure-receiving chamber 164 and the equilibrium chamber 166 are held in fluid communication with each other through an orifice passage 168.

When such a known suspension-type fluid-filled vibration damping mount is installed in position, a static load or weight of the vibrative member, e.g., the power unit, is applied between the first mounting member 150 and the second mounting member 152 in the axial direction, and a vibrational load is primarily applied between the first and second mounting members 150, 152 in the axial direction, as well. Thus, the known suspension-type fluid-filled vibration damping mount is tuned to exhibit a damping effect based on resonance or flow of the fluid through the orifice passage 168 to vibrations applied thereto in the axial direction.

However, the known suspension-type fluid-filled vibration damping mount may be subjected to vibration applied thereto in diametric directions perpendicular to the axial direction (hereinafter referred to as "axis-perpendicular directions, where appropriate), depending upon a state of installation thereof, for example. If the suspension-type fluid-filled vibration damping mount is used as an engine mount for an automotive vehicle, for example, the engine mount may be subjected to vibrational loads applied between the first mounting member 150 and the second mounting member 152 in the axis-perpendicular directions, e.g., in a driving or a longitudinal direction of the vehicle and/or in a lateral direction of the vehicle, when the vehicle is accelerated, runs over steps, goes through corners, or experiences any other possible driving conditions. Actually, the known suspension-type fluid-filled vibration damping mount has not been sufficiently examined in its damping capability in relation to vibrations applied thereto in the axis-perpendicular directions.

In view of the above, the present inventors have conducted extensive studied and researches on damping characteristics of the known suspension-type fluid-filled vibration damping mount upon application of vibrations thereto in the diametric directions, and it has been revealed that the known suspension-type fluid-filled vibration damping mount is incapable of exhibiting a desired damping effect with respect to vibrations applied thereto in the radial directions. In particular, the suspension-type fluid-filled vibration damping mount is susceptible to be considerably deteriorated in its damping capability at around a higher frequency range of input vibrations corresponding to an acceleration noise of 300–500 Hz, e.g., booming noises and chatter noises.

SUMMARY OF THE INVENTION

It is therefore one object of this invention to provide a suspension-type fluid-filled vibration damping mount novel in construction and capable of exhibiting an improved damping performance with respect to vibrations applied thereto in a diametric direction perpendicular to its axial direction, without deteriorating its damping performance with respect to vibrations applied thereto in the axial direction, as well as its manufacture efficiency due to increase in the number of components or the like.

In an attempt to solve the conventionally experienced problem, the present inventors have been conduced a further extensive study of the suspension-type fluid-filled vibration damping mount. In the suspension-type fluid-filled vibration damping mount, the elastic body needs to has a generally frusto-conical shape with its central portion bonded to the first mounting member extending largely into a pressure receiving chamber from a lower open end of the second mounting member, in order to effectively prevent or minimize tensile stress generated in the elastic body when the mount is installed in position and a static load, e.g. the weight of the power unit acts on the elastic body. When the suspension-type fluid-filled vibration damping mount constructed as described above is subjected to vibrations applied thereto in radial directions perpendicular to its axial direction, the central portion of the elastic body is forced to move back and force or displace reciprocatively in the radial or diametric directions within the fluid chamber. As a result, an annular region defined by and between the central portion of the elastic body and the cylindrical portion of the second mounting member opposed to the central portion of the elastic body in the axis-perpendicular directions, undergoes volumetric variation in a circumferential direction thereof, thus causing flow of the fluid in the circumferential direction within the annular region. In view of the above, the present inventors have concluded that the suspension-type fluid-filled vibration damping mount may suffer from considerable increase in its spring constant based on resonance effect of the fluid flowing through the annular region, upon application of vibration whose frequency range is higher than a resonance frequency of the fluid flowing through the annular region.

In the light of the above described conclusion, the present inventors have conducted still further extensive studies and researches of the suspension-type fluid-filled vibration damping mount, and have developed the present invention supported by a number of experimental results. There will be described presently preferred modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention is a fluid-filled vibration damping mount of suspension type, comprising: (a) a first mounting member; (b) a second mounting member having a generally hollow cylindrical configuration whose lower open end portion is situated about the first mounting member; (c) a generally tapered elastic body elastically connecting the first and second mounting members together, the elastic body extending from the lower open end portion of the second mounting member to an inside of the second mounting member, and fluid-tightly closing the lower open-end portion of the second mounting member; (d) a flexible layer fluid-tightly closing an upper open-end portion of the second mounting member for forming a fluid chamber defined between the elastic body and the flexible layer and filled with a non-compressible fluid; (e) a partition member disposed within the fluid chamber so as to extend in an axis-perpendicular direction perpendicular of the second mounting member, and fixedly supported at an peripheral portion thereof by the second mounting member, for fluid-tightly dividing the fluid chamber into a pressure-receiving chamber partially defined by the generally tapered elastic body and an equilibrium chamber partially defined by the flexible layer; (f) an orifice passage for permitting a fluid communication between the pressure-receiving chamber and the equilibrium chamber; and (g) a pair of restricting projections each being bonded to the partition member and projecting from the partition member into the pressure-receiving chamber so as to be situated in a region defined by and between an outer circumferential surface of the elastic body and an inner circumferential surface of the second mounting member for restricting the region, the pair of restricting projections being situated at respective circumferential positions mutually opposed in the axis-perpendicular direction mutually opposed in the axis-perpendicular direction of the second mounting member, and extending substantially circumferentially with a circumferential length smaller than a half of a circumference of the partition member.

In the fluid-filled vibration damping mount constructed according to this mode of the invention, the pair of restricting projections projecting from the partition member, are situated in the region extending circumferentially between opposing surfaces of the elastic body and the second mounting member. Although the region is considered to form a fluid passage during input of a vibrational load in an axis-perpendicular direction, a cross sectional area of the fluid passage formed in this region is reduced or restricted by the restricting projections. This arrangement makes it possible to shift a resonance frequency of the fluid flowing through this region to a lower frequency range, which does not matter in terms of a vibration-damping capability of the vibration damping mount. Therefore, the fluid-filled vibration damping mount constructed according to this mode of the invention is capable of eliminating or moderating a tendency for its dynamic spring constant to considerably increase owing to the presence of this region during input of vibrations over a specific frequency range, e.g., an acceleration noise in an automotive vehicle, owing the presence of this region.

Each of the restricting projections is arranged to be spaced away from both of the elastic body and the second mounting member both defining a wall of the pressure receiving chamber. Further each restricting projection s formed of an elastic material such as a rubber elastic body. Yet further, the pair of restricting projections are formed with the angular length of smaller than 180, and are separated from each other. These arrangements permit a relatively readily elastic deformation of the restricting projections. Therefore, if the fluid is forced to flow circumferentially within the pressure receiving chamber during input of a vibrational load in an axis-perpendicular direction, the readily deformable restricting projections are easily deformed by the fluid pressure, facilitating disturbance of flows of the fluid through the annular region. Also, the readily elastic deformation of the restricting projections produces another resonance system in association with elastic deformation of the restricting projections. Thus, the present fluid-filled vibration damping mount of the invention can actively exhibit an effect of low dynamic spring constant due to the elastic resonance of the restricting projections or the like. It should be noted that each of the restricting projections may have a variety of configuration provided that it extends in a substantially circumferential direction on the partition member, with a circumferential length smaller than the half of the circumference of the partition member. Preferably, each of the restricting projections has an angular length smaller than 180 degrees about a center axis of the second mounting member.

Still further, the pair of restricting projections are formed independently of the elastic body and bonded to the partition member, and project into the pressure-receiving chamber according to this mode of the invention. This arrangement effectively prevents an essential damping characteristic of the vibration damping mount based on the elastic body from being adversely influenced or deteriorated by the presence of the restricting projection, while sufficiently maintaining operation efficiency in assembling components of the vibration damping mount. In particular, this arrangement makes it possible to form the restricting projections with a rubber material different from that of the rubber elastic body. Therefore, a natural frequency of the resonance system in association with the elastic deformation of the elastic restricting projection can be desirably determined with a high degree of freedom, without being limited by a requirement for spring characteristics of the elastic body or the like.

A second mode of the invention is a fluid-filled vibration damping mount according to the first mode, wherein each of the restricting projections has a width dimension varying in a height direction so that a width dimension in a distal end portion is smaller than that in a proximal end portion. This arrangement further facilitates elastic deformation of the restricting projections, making it enabling for the mount to advantageously ease the tendency for its dynamic spring constant to considerably increase with respect to an input vibration in the axis-perpendicular direction. This advantage of the invention may be caused with the help of elastic deformation of the restricting projections per se, and the help of the resonance system produced by the elastic deformation of the restricting projections.

Preferably, each restricting projection has an outer circumferential surface extending generally straightly in the axial direction over its entire area, while being spaced away from the inner circumferential surface of the second mounting member with a substantially constant spacing therebetween. On the other hand, an inner circumferential surface of each restricting projection extends generally straightly in the axial direction from the proximal end portion to an intermediate portion thereof, but extends slanting diametrically outwardly from the intermediate portion to the distal end portion thereof so as to be spaced away from the elastic body with a substantially constant spacing therebetween. In this arrangement, the proximal end portion of each restricting projection, which is bonded to the partition member, protrudes downwardly from the partition member by a given height dimension with a generally constant width, and the distal end portion of the restricting projection has a tapered cross sectional shape with an inner surface gradually extending radially outwardly as it goes from the intermediate portion to the distal end portion thereof. The restricting projection arranged as described above makes it possible to prevent or limit an abutting contact of the elastic body with the restricting projections, while effectively restricting an annular region which may provide the fluid passage within the pressure-receiving chamber upon application of vibrations thereto in the radial directions.

A third mode of the invention is a fluid-filled vibration damping mount according to the first or second mode, wherein the angular length of each of the restricting projection is held within a range of 30–120 degrees about the center axis of the second mounting member. According to this arrangement, each of the restricting projections can effectively restrict the annular region that may provide the circumferential fluid passage within the pressure receiving chamber, thereby exhibiting a sufficient effect for easing a considerable increase of the dynamic spring constant of the mount during input of vibrations in a target high frequency range. This easing effect may be caused due to resonance of the fluid flowing through the region. Additionally, each of the restricting projections has an advantageous configuration easy of elastic deformation elastically deformed. Therefore, the fluid-filled vibration-damping mount is able to exhibit a low-dynamic spring constant that may be caused by the resonance system generated by the elastic deformation of the elastic restricting projections.

A fourth mode of the invention is a fluid-filled vibration damping mount according to any one of the first through third modes, wherein the pair of restricting projections are formed substantially equally in configuration and size. According to this arrangement, the fluid-filled vibration-damping mount can enhance its damping characteristics on the basis of the effect generated by the pair of restricting projections as discussed above, with respect to a target frequency vibration.

A fifth mode of the invention is a fluid-filled vibration damping mount according to any one of the above indicated first through fourth modes, wherein the partition member includes a communication hole formed therethrough that is situated between mutually opposite circumferential end faces of the pair of restricting projections for connecting the orifice passage to the pressure receiving chamber. This arrangement makes it possible to form the communication hole with a relatively wide area, by effectively utilizing a space formed between the opposite circumferential end faces of the pair of restricting projections. Thus, the fluid-filled vibration damping mount can an intended damping effect based on resonance of the fluid flowing through the orifice passage in a further advantageous manner.

A sixth mode of the invention is a fluid-filled vibration damping mount according to any one of the first through fifth modes, wherein the partition member includes a through hole formed through a central portion thereof, wherein the through hole is fluid-tightly closed by a partition rubber plate so that a fluid pressure in the pressure receiving chamber and a fluid pressure in the equilibrium chamber are exerted on an upper and lower faces of the partition rubber plate, respectively, and wherein the pair of restricting projections and the partition rubber plate are integrally formed with each other. According to this arrangement, the pair of restricting projections can be readily and advantageously formed integrally with the partition rubber plate, in the case where the partition rubber plate may be employed for reducing or absorbing the fluid pressure variation in the pressure-receiving chamber in order to prevent the dynamic spring constant from increasing upon application of axial or vertical vibrations over a higher frequency range in which a resistance to flow of the fluid through the orifice passage is too high to permit the flow of the fluid therethrough. Thus, efficiency in manufacture and simplicity in structure of the fluid-filled vibration-damping mount can be achieved in a further advantageous manner.

A seventh mode of the invention is a fluid-filled vibration damping mount according to any one of the first through sixth modes, further comprising at least one abutting fin integrally formed with the elastic body and/or the second mounting member, the at least one abutting fin projecting from at least one of opposing faces of the elastic body and the second mounting member toward an other one of the opposing faces so that the at least one abutting fin further restrict the region defined between the opposing surfaces at at least one circumferential position in a state where a suspending load is exerted between the first and second mounting member. In the fluid-filled vibration damping mount constructed according to this mode of the invention, the cross sectional area of the space defined between axially opposite surfaces of the elastic body and the restricting projection is further reduced by means of the first abutting fin, and accordingly, the cross sectional area of the fluid passage formed in the annular region of the pressure-receiving chamber is more reduced than that in the fluid-filled vibration damping mount where the restricting projection with no fin is provided. Thus, the fluid-filled vibration damping mount is capable of further effectively moderating or eliminating the tendency for its dynamic spring constant to considerably increase when being subjected to vibrations over a higher frequency range applied thereto in the radial directions, which tendency may be caused by anti-resonance motion of the non-compressible fluid upon application of the vibrational load over a higher frequency range.

In addition, the abutting fin formed on the surface of the tapered elastic body and/or the restricting projection is made in a thin-walled fin shape out of an elastic material such as a rubber elastic body, so that the abutting fin is more readily elastically deformed when being brought into abutting contact with the surface of the other one of the elastic body and the restricting projection. Thus, the abutting fin may exhibit a shock absorbing effect upon the abutting contact between the restricting projection and the elastic body, making it possible to eliminate or reduce abutting noises generated upon the above-indicated abutting contact.

The abutting fin can be formed on either of the elastic body and the elastic restricting projections, and may be formed on a desired one designated by taking into account a required damping capability, and/or efficiency in manufacturing of the mount. Further, the number of the abutting fin is not particularly limited, provided at least one of the abutting fin is formed on at least one of the surface of the elastic body and the restricting projections.

A eighth mode of the invention is a fluid-filled vibration damping mount according to any one of the first through seventh modes, wherein an outer peripheral portion of the flexible layer is bonded to an annular fixing ring that is superposed on an outer peripheral portion of the partition member, the fixing ring and the partition member being firmly fixed at the peripheral portions thereof to an upper open end portion of the second mounting member by caulking, while cooperating to each other to define therebetween the orifice passage extending in the outer peripheral portion of the partition member. This arrangement makes it possible to fluid-tightly close the upper open end portion of the second mounting member with the flexible layer, by effectively utilizing the caulking structure to fasten the partition member to the second mounting member, while obtaining a sufficient length of the orifice passage. More preferably, the orifice passage may have a structure, wherein the partition member is formed of a single metallic plate, and at least one of the partition member and the annular fixing metallic member is bent so that the partition member and the annular fixing metallic member cooperate to define therebetween a circumferentially extending gap functioning as the orifice passage.

A ninth mode of the invention is a fluid-filled vibration damping mount according to any one of the firth through eighth modes, wherein the elastic body has a wall thickness dimension varying in the circumferential direction thereof so that a pair of thin-walled portion are opposed in a first diametric direction with the first mounting member interposed therebetween, and a pair of thick-walled portion are opposed in a second diametric direction perpendicular to the first diametric direction, wherein the axis-perpendicular direction in which the pair of restricting projections are opposed to each other is arranged to substantially conform to the second diametric direction, and wherein the vibration damping mount is usable as an engine mount by installed on a vehicle such that the second diametric direction in which the thick-walled portions are opposed is oriented to a lateral direction of the vehicle, and the first diametric direction in which the thin-walled portions are opposed are oriented to a longitudinal direction of the vehicle. In the engine mount according to this mode of the invention, a required high spring stiffness in the vehicle lateral direction can be generated by means of the pair of thick-walled portions of the elastic body, leading to an excellent driving stability of the vehicle. On the other hand, a required low spring stiffness in the vehicle driving direction can be provided by means of the pair of thin-walled portions of the elastic body, leading to an excellent driving comport of the vehicle. Moreover, when the vehicle is subjected to a vibration input in the vehicle driving direction due to acceleration or similar driving condition of the vehicle, the circumferential fluid passage, which may be generated in the pressure-receiving chamber, can be effectively restricted or narrowed by the provision of the pair of restricting projections. As a result, a likelihood of increase of the dynamic spring constant of the mount at a relatively higher frequency range of input vibrations can be effectively eliminated or minimized, thus ensuring a further enhanced driving comfort of the vehicle.

A tenth mode of the invention is a fluid-filled vibration damping mount according to any one of the firth through ninth modes, wherein the pair of restricting projections are arranged in configuration, size and/or material so that the mount exhibits an effect of low dynamic spring constant thereof based on resonance of circumferential flow of the fluid generated in the pressure receiving chamber with respect to vibrations of frequency within a range of 150–300 Hz, and exhibits an effect of low dynamic spring constant thereof based on elastic resonance of the pair of restricting projections with respect to vibrations of frequency within a range of 300–500 Hz. In the present mode of the invention, the fluid-filled vibration damping mount can exhibits an excellent damping performance owing to its low dynamic spring constant in the first diametric direction perpendicular to the second diametric direction in which the pair of restricting projections are opposed, with respect to input vibrations over a wide frequency range. For instance, the mount can exhibit considerably efficient damping effect with respect to vibrations excited in the vehicle, such as booming noise during driving, booming or chattering noises during acceleration, or the like.

BRIEF DESCRIPTION OF THE DRAWINGS

The forgoing and/or other objects features and advantages of the invention will become more apparent from the following description of preferred embodiments with reference to the accompanying drawings in which like reference numerals designate like elements and wherein.

DETAILED DESCRIPTION OF PREFERRED EMBODIMENTS

Figure 1:
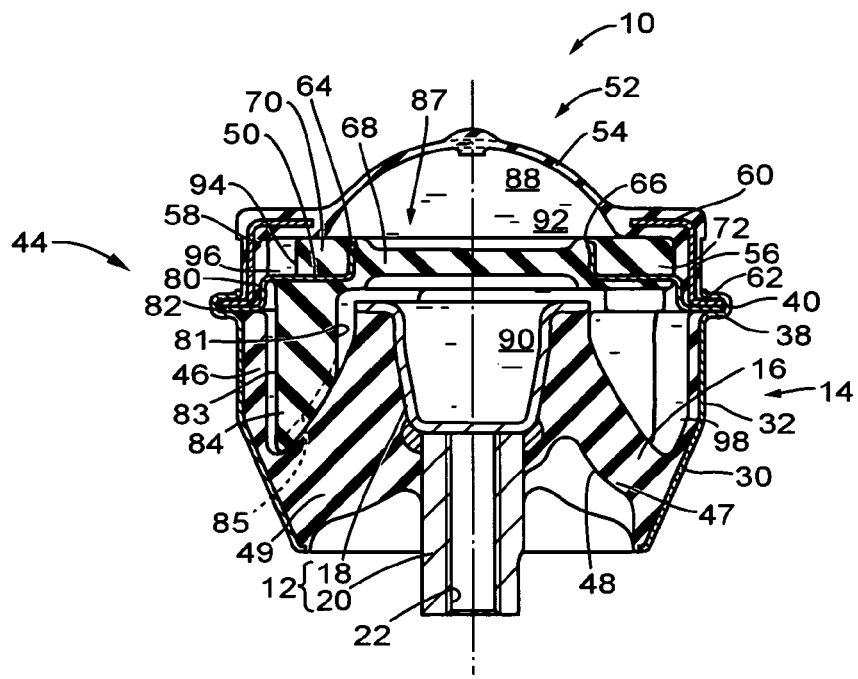
FIG. 1 is an elevational view in axial or vertical cross section of an engine mount for use in an automotive vehicle, which is constructed according to a first embodiment of a fluid-filled vibration-damping mount of the invention, and which corresponds to a view taken along line I—I of FIG. 1.

Referring first to FIG. 1, an engine mount 10 for automotive vehicles is shown as one embodiment of the fluid-filled vibration damping mount of the present invention. This engine mount 10 includes an inner shaft member 12 functioning as a first mounting member and an outer cylindrical member 14 functioning as a second mounting member, which are both made of metal, and are situated opposite to each other with a radial spacing therebetween. The inner shaft member 12 and the outer cylindrical member 14 are elastically connected to each other by a rubber elastic body 16 interposed therebetween. The engine mount 10 is installed on the vehicle such that the inner shaft member 12 is attached to a power unit of the vehicle (not shown), while the outer cylindrical member 14 is attached to a body of the vehicle (not shown), so that the power unit is suspended from the body in a vibration-damping or isolating manner. With the engine mount 10 installed on the vehicle as described above, the weight of the power unit acts on the engine mount 10 in the vertical direction as seen in FIG. 1. This static load causes a certain amount of elastic deformation of the elastic body 16 so that the inner shaft member 12 is displaced by a suitable amount relative to the outer cylindrical member 14 in the vertically downward direction. The engine mount 10 receives a vibrational load primarily in the substantially vertical direction as seen in FIG. 1. In the following description, the vertical direction is basically equal to the vertical direction as seen in FIG. 1, that is substantially equal to the vertical direction of the engine mount installed in position.

Figure 9:
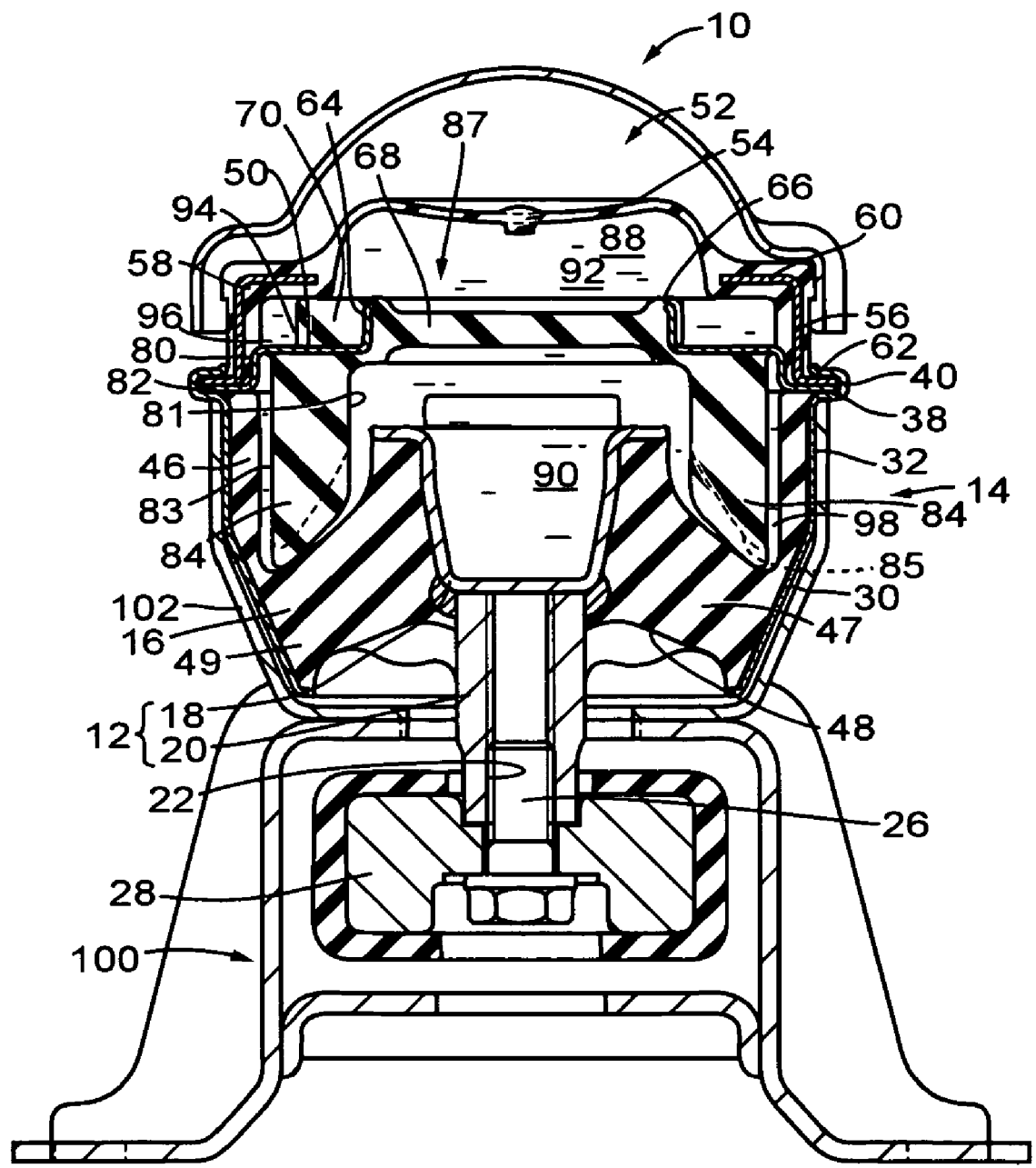
FIG. 9 is an elevational view in axial or vertical cross section of the engine mount of FIG. 1 in a state where the engine mount is installed on an automotive vehicle.

More specifically, the inner shaft member 12 includes a metallic cup member 18 of generally cylindrical cup shape, and a metallic tube member 20 of generally cylindrical shape, which is fixed to a bottom surface of the cup shaped member 18 by welding. The metallic tube member 20 has a threaded central bore that serves as a tapped hole 22. As shown in FIG. 9, a mounting bolt 26 is screwed into the tapped hole 22 of the inner shaft member 12 so that the inner shaft member 12 is fixedly attached to a bracket 28 fixed to the power unit (not shown).

The outer cylindrical member 14 is a large-diameter thin-walled generally hollow cylindrical member whose diameter is made sufficiently larger than an outer diameter of the inner shaft member 12. The outer cylindrical member 14 includes at its axially lower end portion a tapered cylindrical portion 30 whose diameter gradually decreases in the axially outward or downward direction, and at its axially upper end portion a large-diameter cylindrical portion 32 whose inner and outer diameters are made constant over its entire axial length. In the present embodiment, the tapered cylindrical portion 30 and the large-diameter cylindrical portion 32 cooperate to each other to provide a vertically extending cylindrical portion 34 of the outer cylindrical portion 14. A shoulder 38 is integrally formed at an open-end portion of the large-diameter cylindrical portion 32 of the outer cylindrical portion 14, i.e., an axially upper open-end portion 36 of the cylindrical portion 34, so as to extend radially outwardly. An outer peripheral portion of the shoulder 38 serves as an integrally formed caulking part 40 that extends axially upwardly as seen in FIG. 1.

The thus formed outer cylindrical member 14 is disposed about the inner shaft member 12 in approximately coaxial or concentric relationship with each other, with a given radial spacing therebetween. The inner shaft member 12 is inserted into the cylindrical member 14 from the lower open end in the axial direction so that the inner shaft member 12 is situated within the outer cylindrical portion 34 by a predetermined axial dimension.

Figure 2:
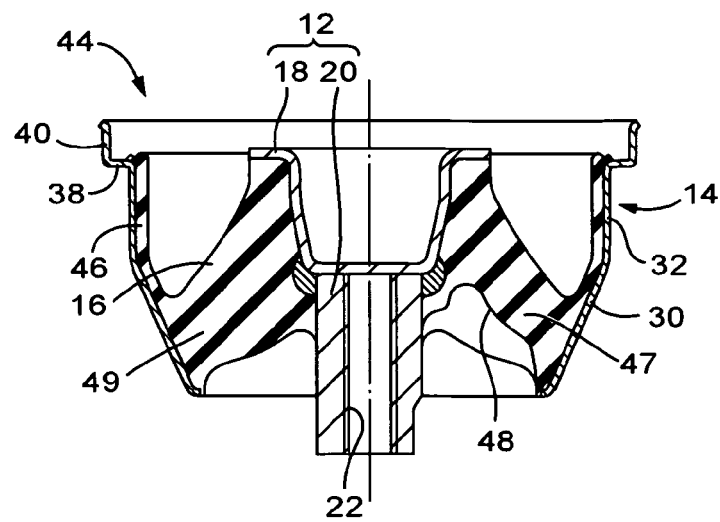
FIG. 2 is an elevational view in axial or vertical cross section of a first integrally vulcanized assembly of the engine mount of FIG. 1, which is taken along line 2—2 of FIG. 3.

The elastic body 16 is interposed between the inner shaft member 12 and the outer cylindrical member 14 disposed relative to each other as described above. This elastic body 16 is a generally tapered thick-walled cylindrical member of tapered profile whose diameter gradually increases as its goes axially downwardly as seen in FIG. 1. The elastic body 16 is bonded at an inner circumferential surface of its small diameter end portion to an outer circumferential surface of the inner shaft member 12, and an outer circumferential surface of its large diameter end portion to an inner circumferential surface of the outer cylindrical member 14, when a rubber material is vulcanized to form the elastic body 16, thereby providing a first integrally vulcanized assembly 44 as shown in FIG. 2, in which the inner shaft member 12 and the outer cylindrical member 14 are bonded together via the elastic body 16. In the first integrally vulcanized assembly 44, the lower open-end portion 42 of the cylindrical portion 34 of the outer cylindrical member 14 is fluid-tightly closed by the elastic body 16 and the inner shaft member 12. The elastic body 16 is integrally formed with a generally cylindrical rubber coating layer 46 that is bonded to and coats a substantially entire area of an inner circumferential surface of the outer cylindrical member 14.

Figure 3:
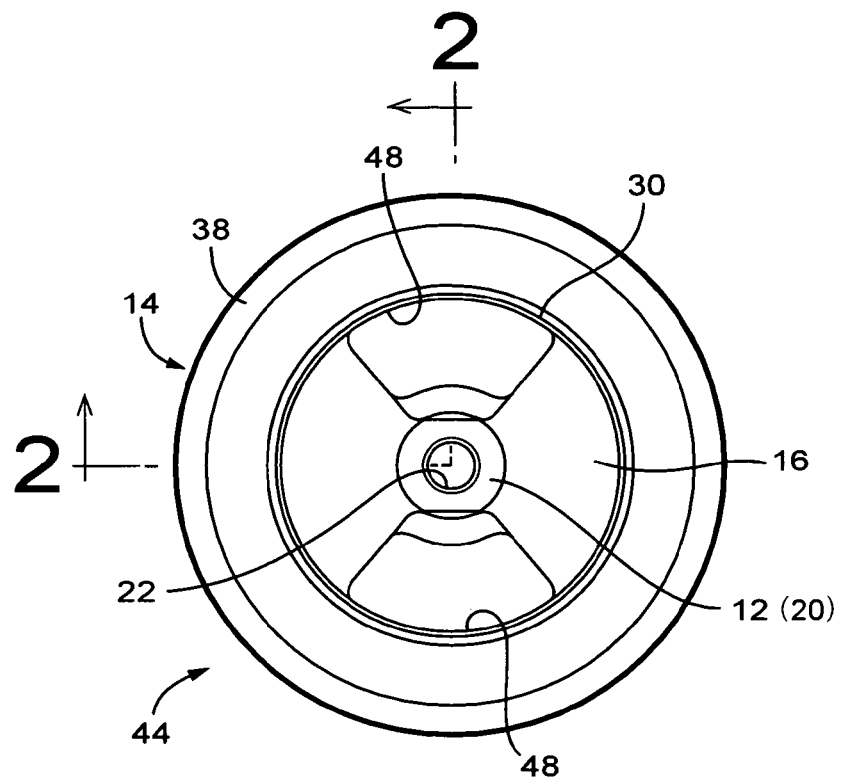
FIG. 3 is a bottom plane view of the first integrally vulcanized assembly of FIG. 2.

Further, the elastic body 16 is formed with a pair of pocket-like recesses 48, 48 open in its lower end face at respective circumferential portions which are opposed to each other in a diametric direction of the elastic body 16 with the inner shaft member 12 interposed therebetween. Each of the recesses 48 extend circumferentially with a circumferential length of about ¼ of a circumference of the elastic body 16. By the provision of the pair of recesses 48, 48, a wall thickness dimension of the elastic body 16 is partially reduced, thereby providing a pair of thin walled portions 47, 47 mutually opposed in a first diametric direction, and a pair of thick walled portion 49, 49 mutually opposed in a second diametric direction that is substantially perpendicular to the first diametric direction. With this arrangement, a spring ratio (spring constant in the first diametric direction/spring constant in the second diametric direction) of the engine mount 10 are desirably arranged so that the engine mount 10 can exhibit a low spring stiffness in the first diametric direction in which the thin walled portions 47, 47 opposed to each other, and a high spring stiffness in the second diametric direction in which the thick-walled portions 49, 49 opposed to each other. In the present embodiment, the diametric direction of the elastic body 16 in which the pair of recesses 48, 48 are opposed to each other (i.e., the vertical direction in FIG. 3) is approximately aligned to a longitudinal or a driving direction of the vehicle. Therefore, the spring stiffness or characteristics of the elastic body 16 is lower or softer in the longitudinal direction of the vehicle than that in the horizontal direction of the vehicle.

Referring back to FIG. 1, a metallic partition member 50 and a lid member 52 are superposed in this order on the upper open-end portion of the cylindrical portion of the outer cylindrical member 14.

Figure 4:
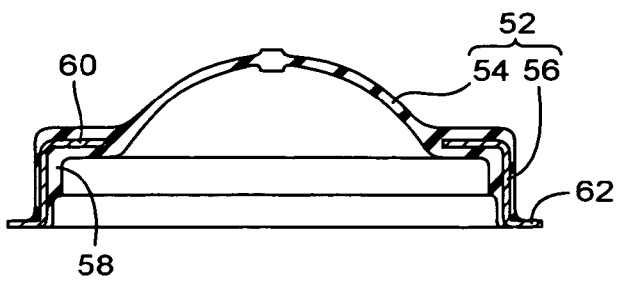
FIG. 4 is an axial or vertical cross sectional view of a lid member of the engine mount of FIG. 1.

As shown in FIG. 4, the lid member 52 includes a flexible layer in the form of a flexible diaphragm 54 and an annular fixing metallic member in the form of a metallic lid 56. The flexible diaphragm 54 is formed of an easily deformable thin-walled rubber elastic layer with a thin-walled dome-like configuration in its entirety, and open to the axially lower part of the engine mount 10. A generally annular sealing rubber layer 58 is integrally formed at an open-end peripheral portion (outer circumferential edges portion) of the diaphragm 54. The metallic lid 56 is a generally large-diameter cylindrical member formed of metal by pressing, and includes an annular top-wall portion 60 integrally formed at its axially upper end portion so as to extend radially inwardly to have a generally annular shape, and an outward flange portion 62 integrally formed at its axially lower end portion so as to extend radially outwardly. A generally entire portion of the metallic lid 56, except the outward flange portion 62, is coated by the sealing rubber layer 58. Thus, the flexible diaphragm 54 and the metallic lid 56 cooperate to form the lid member 52 as an integrally vulcanized assembly.

Figure 5:
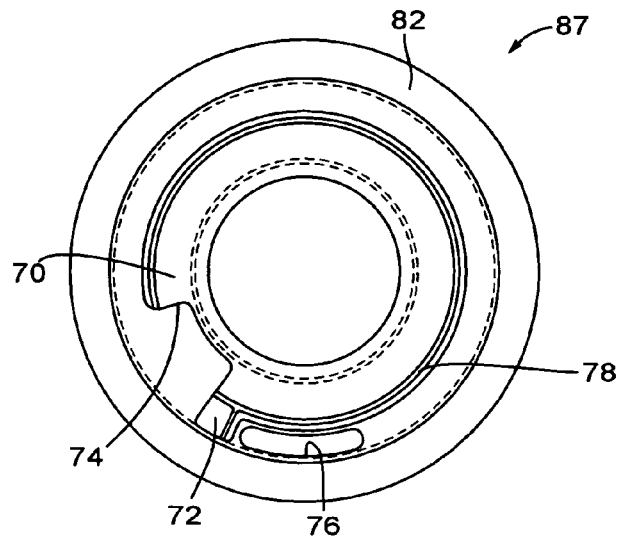
FIG. 5 is a top plane view of a second integrally vulcanized assembly of the engine mount of FIG. 1.
Figure 6:
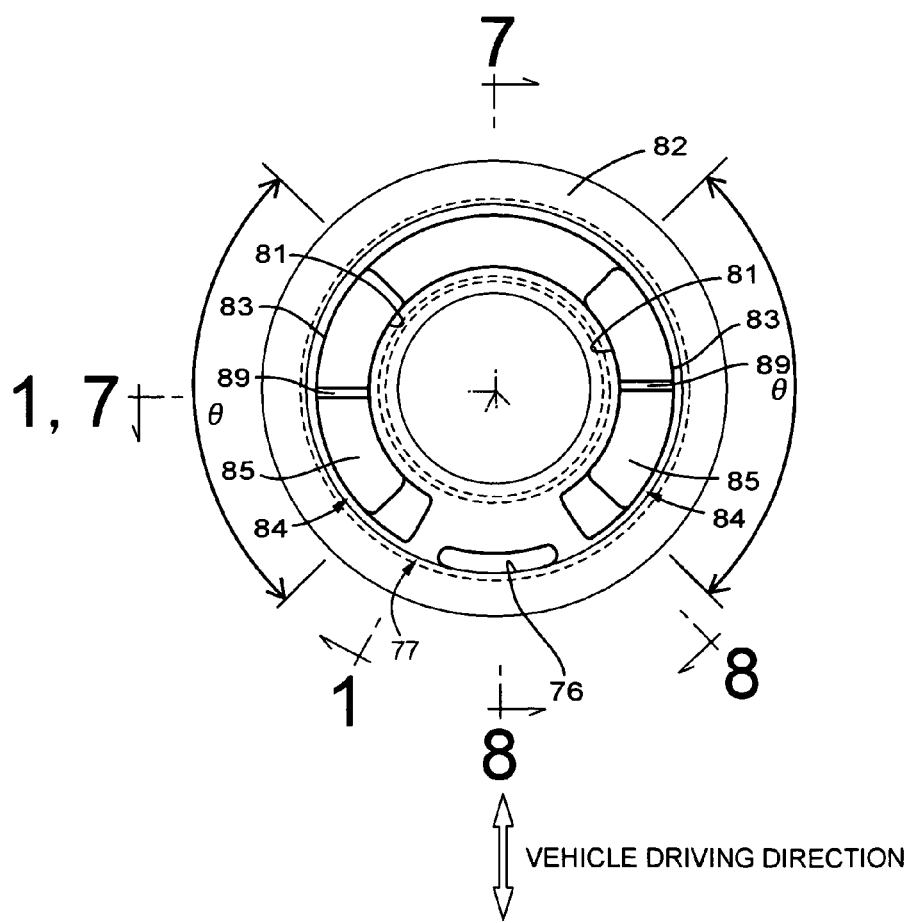
FIG. 6 is a bottom plane view of the engine mount of FIG. 5.
Figure 7:
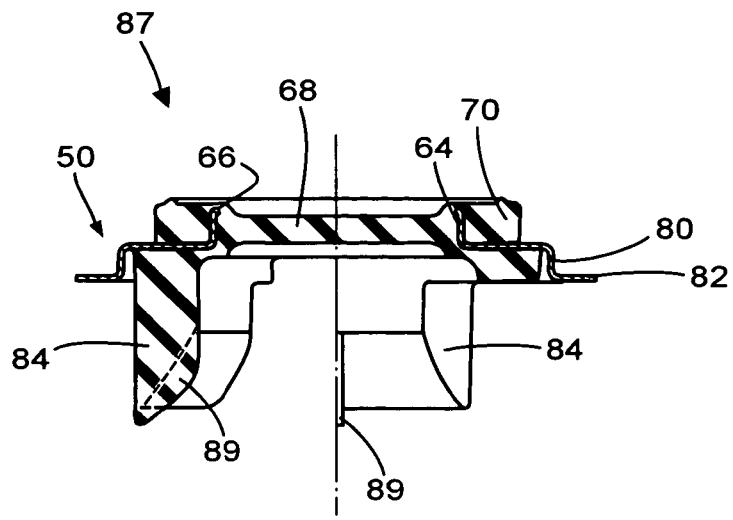
FIG. 7 is a cross sectional view taken along line 7—7 of FIG. 6.

Referring next to FIGS. 5–7 showing the metallic partition member 50, the metallic partition member 50 is a generally annular member formed of metal by pressing, and defines a through hole 66 in its central portion. The metallic partition member 50 includes a cylindrical wall portion 64 integrally formed at a peripheral portion of the through hole 66 so as to extend axially upwardly as seen in FIGS. 6 and 7. In order to close the through hole 66, a partition rubber plate in the form of an elastic rubber plate 68 is disposed in the through hole 66 so as to extend radially outwardly. The elastic rubber plate 68 is a generally disk-like member with a generally constant wall thickness entirely, and is bonded at its peripheral portion to the cylindrical wall portion 64 of the metallic partition member 50 with the cylindrical wall portion 64 embedded within the peripheral portion of the elastic rubber plate 68, when a rubber material is vulcanized for forming the elastic rubber plate 68.

On an upper surface of the metallic partition member 50, as shown in FIG. 5, a rubber inner circumferential wall 70 having a generally annular block-like shape is bonded in the process of vulcanization of a rubber material for forming the inner circumferential wall 70. The inner circumferential wall 70 extends over a generally entire circumference around the through hole 66 with a given width dimension extending from an inner peripheral portion to a radially intermediate portion of the upper surface of the metallic partition member 50. One circumferential portion of the inner circumferential wall 70 protrudes radially outwardly, to thereby provide an elastic partition wall 72 as an integral part. On one of circumferentially opposite sides of the elastic partition wall 72, the wall-thickness of the inner circumferential wall 70 is reduced over a predetermined circumferential distance so as to provide a communication groove 74 of substantially rectangular groove shape and extending radially inwardly with a given width. Thus, the inner circumferential wall 70 is substantially partially eliminated or cut-off on the one side of the elastic partition wall 72 to provide the communication groove 74. On the other side of the elastic partition wall 72, there is formed a communication hole 76 extending through the metallic partition member 50 in the thickness direction. A sealing lip 78 may be integrally formed on the upper surfaces of the inner circumferential wall 70 and the elastic partition wall 72, as needed.

The metallic partition member 50 provides at its radially intermediate portion a cylindrical stepped portion 80 situated radially outward of the inner circumferential wall 70, and continuously extends in the circumferential direction about the inner circumferential wall 70. The cylindrical stepped portion 80 extends axially downward. On the lower edge side of the cylindrical stepped portion 80, is integrally formed a flange portion 82 extending radially outward. On the lower face of the metallic partition member 50, integrally bonded by rubber material vulcanization is a pair of restricting projections 84, 84 situated radially inward of the cylindrical stepped portion 80 and projecting vertically or axially downward. As is apparent from FIGS. 1, 6, 7 and 8, the pair of restricting projections 84, 84 are integrally bonded to an outer peripheral portion of the elastic rubber plate 68 bonded by rubber material vulcanization to the metallic partition member 50 to coat the lower face of the metallic partition member 50. The pair of restricting projections 84, 84 are situated at respective positions mutually opposite in a diametric direction perpendicular to a center axis of the metallic partition member 50, and extend substantially circumferentially, e.g. about the center axis with an predetermined angular length θ. Preferably, the pair of restricting projections 84, 84 are arranged symmetrically to each other with respect to the center axis of the metallic partition member 50, and have an angular length within a range of 30≦θ≦120.

In the present embodiment, each restricting projection 84 has a proximal end portion (i.e., a portion close to the metallic partition member 50) of thick-walled cylindrical configuration. The proximal end portion of each restricting projection 84 extends in its axial direction, thereby providing cylindrical inner and outer circumferential surfaces 81, 83. On the other hand, a distal end portion of each restricting projection 84 provides a cylindrical surface by its outer wall, but a tapered inner circumferential surface 85 by its inner wall. Namely, the tapered inner circumferential surface 85 has a diameter gradually increases as its goes downward, whereby each restricting projection 84 has a tapered configuration in its entirety.

Furthermore, each restricting projection 84 has an elastic abutting fin 89. The abutting fin 89 is formed of a rubber elastic body, and is integrally formed on the tapered inner circumferential surface 85 such that the abutting fin 89 projects out from the surface 85 with a thin plate configuration extending straightly in a sloped direction of the surface 85. The abutting fin 89 is formed entirely with a substantially constant height dimension and a wall-thickness dimension. In the present embodiment, each restricting projection 84 is formed with one abutting fin 89 situated at a circumferentially central portion thereof. A number of the abutting fin 89 is not limited to the present embodiment, and a plurality of abutting fins may be formed on a plurality of circumferential portions of the restricting projection 85. Also, the abutting fin 89 may have a configuration extending to the outer circumferential surface of the restricting projection 84 and/or the inner circumferential surface of the proximal end portion of the restricting projection 84.

As clearly shown in FIG. 6, the elastic rubber plate 68, which is bonded to the lower face of the metallic partition member 50, has a thin walled portion 77 that is situated in one side of another diametric direction perpendicular to the diametric direction in which the restricting projections 84, 84 are opposed to each other. The communication hole 76 is situated at and open in a substantially central portion of the thin walled portion 77.

The elastic rubber plate 68, the restricting projections 84, 84, the elastic partition wall 72, and the inner circumferential wall 70 are integrally formed by a rubber elastic body bonded to the metallic partition member 50 in an integral vulcanization molding of a rubber material with the metallic partition member 50. Namely, the elastic rubber plate 68, the restricting projections 84, 84 and the others cooperate with the metallic partition member to provide a second integrally vulcanized assembly 87.

Figure 8:
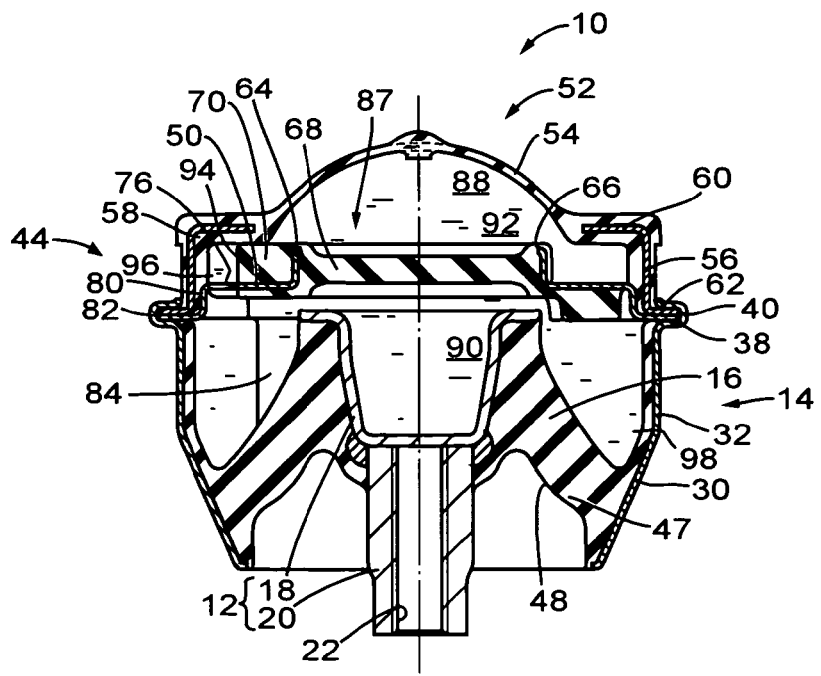
FIG. 8 is an elevational view in axial or vertical cross section of the engine mount of FIG. 1, taken along line 8—8 of FIG. 6.

As is understood from FIGS. 1 and 8, the metallic partition member 50 and the lid member 52 superposed on the metallic partition member 50 in the axial direction, are assembled to the upper open-end portion of the outer cylindrical member 14 such that the flange portion 82 of the metallic partition member 50 and the outward flange portion 62 of the lid member 52 are laminated on the shoulder portion 38 of the outer cylindrical member 14, and are firmly fixed to the outer cylindrical member 14 by pressingly bending the caulking portion 40 against these flange portions 82 and 62 in the process of caulking fixation.

With the metallic partition member 50 and the lid member 52 firmly fixed to the outer cylindrical member 14 by caulking as described above, the upper open-end portion 36 of the outer cylindrical member 14 is fluid-tightly closed by these two members 50, 52. In the thus constructed engine mount 10, the elastic body 16 and the flexible diaphragm 54 cooperate with the outer cylindrical member 14 to define therebetween a fluid chamber 88 filled with a suitable non-compressible fluid.

Within the fluid chamber 88, is disposed the metallic partition member 50 extending in the radial direction perpendicular to the axial direction of the engine mount 10. Thus, the partition member 50 divides the fluid chamber 88 into two sections on the axially opposite sides thereof, namely, a pressure-receiving chamber 90 partially defined by the elastic body 16 and located on the axially lower side wherein the inner shaft member 12 is disposed, and an equilibrium chamber 92 partially defined by the flexible diaphragm 54 and located on the axially upper side wherein the lid member 52 is disposed. Upon application of the vibration between the inner shaft member 12 and the outer cylindrical member 14, the pressure of the fluid in the pressure-receiving chamber 90 varies due to elastic deformation of the elastic body 16, while the volume of the equilibrium chamber 92 is permitted to vary by elastic deformation of the flexible diaphragm 54.

The filling of the fluid chamber 88 with the non-compressible fluid is advantageously conducted by assembling the metallic partition member 50 (i.e., the second integrally vulcanized assembly 87) and the lid member 52 with respect to the first integrally vulcanized assembly 44, in a mass of the selected non-compressible fluid. The non-compressible fluid filling the fluid chamber 88 may be preferably selected from among water, alkylene glycol, polyalkylene glycol and silicone oil, for instance. In order to obtain an excellent vibration-damping effect based on resonance of the fluid, the fluid may preferably have a low viscosity of not more than 0.1 Pa·s.

With the metallic partition member 50 and the lid member 52 assembled with each other as described above, an inner circumferential surface of the annular top-wall portion 60 of the lid member 56 is forcedly fitted onto an outer peripheral portion of the inner circumferential wall 70 formed on the metallic partition member 50 via the sealing rubber layer 58 interposed therebetween. Thus, the inner circumferential wall 70 and the lid member 56 are opposed to each other in the radial direction of the engine mount 10 with a given spacing therebetween, while the metallic partition member 50 and the annular top-wall portion 60 are opposed to each other in the axial direction of the engine mount 10 with a given spacing therebetween, thereby cooperating to each other to define therebetween a circumferential groove 94 extending in their circumferential direction. In one circumferential position of the circumferential groove 94, the elastic partition wall 72 formed on the metallic partition wall 50 is held in close contact at its side wall surface with the sealing rubber layer 58 formed on the lid member 56, and at its upper surface with the sealing rubber layer 58 formed on the annular top-wall portion 60 of the lid member 56. Therefore, the circumferential groove 94 is intercepted at one circumferential position by means of the elastic partition wall 72. On the opposite sides of the elastic partition wall 72, there are suitably positioned the communication hole 76 and a communication groove 74, respectively, so that the circumferential groove 94 communicates at one of circumferentially opposite ends thereof with the pressure-receiving chamber 90 through the communication hole 76 and at the other end with the equilibrium chamber 92 through the communication groove 74. Consequently, the metallic partition member 50, the metallic lid 56 (i.e., the lid member 52) cooperate to form an orifice passage 96 for fluid communication between the pressure-receiving chamber 90 and the equilibrium chamber 92, which is formed at the outer peripheral portion of the metallic partition member 50 so as to extend in the circumferential direction of the metallic partition member 50 with a circumferential length which is slightly smaller than the circumference of the metallic partition member 50.

In the present embodiment, the pair of restricting projections 84, 84 bonded to the metallic partition member 50 are disposed in an annular region 98 of the pressure-receiving chamber 90, which region 98 is defined by and between the elastic body 16 and the outer cylindrical member 14 mutually opposed in an axis-perpendicular or diametric direction, and extends circumferentially. The restricting projections 84, 84 are arranged to be mutually opposed in the diametric direction conforming to the second diametric direction in which the thick walled portions 49, 49 are mutually opposed. Further, each restricting projection 84 is arranged to be spaced away from the elastic body 16 in the axial direction. The inner and outer circumferential surfaces 85, 83 of the restricting projection 84 are spaced away from the outer circumferential surface of the elastic body 16 and the inner circumferential surface of the outer cylindrical member 14 (i.e., the rubber coating layer 46) in the axis-perpendicular direction, respectively. With this arrangement, the inner and outer circumferential surfaces 85, 83 of the restricting projection 84 are entirely spaced away from the inner surface of the pressure-receiving chamber 90. Thus, the restricting projections 84, 84 are disposed within the annular region 98 of the pressure-receiving chamber 90 in a elastically deformable manner, while restricting or reducing a cross sectional area of the annular region 98 of the pressure-receiving chamber 90.

The thus constructed engine mount 10 is installed on the automotive vehicle as illustrated in FIG. 9. Namely, the inner shaft member 12 is firmly attached by means of the mounting bolt 26 screwed into its tapped hole 22 to the bracket 28 fixed to the power unit (not shown) of the vehicle, whereby the inner shaft member 12 is attached to the power unit via the bracket 28. On the other hand, the outer cylindrical member 14 is firmly attached to a bracket 100 that is fixed to the body of the vehicle (not shown), while being secured press-fit into a metallic holder 102 somewhat larger than the cylindrical portion 34 thereof, whereby the outer cylindrical member 14 is attached to the body of the vehicle via the bracket 100. With the engine mount 10 installed in position as shown in FIG. 9, the elastic body 16 is elastically deformed due to the weight of the power unit acting thereon, so that the inner shaft member 12 is axially downwardly displaced by a given amount relative to the outer cylindrical member 14. Thus, the engine mount 10 is constructed and oriented on the automotive vehicle such that a vibrational load acts on the inner shaft member 12 and the outer cylindrical member 14 primarily in the vertical direction as seen in FIG. 9, thus suspending and supporting the power unit from and to the body of the vehicle in a vibration-damping fashion.

When a vibrational load is primarily applied to the engine mount 10 in the vertical direction, a relative fluid pressure difference is induced between the pressure-receiving chamber 90 and the equilibrium chamber 92, thereby causing flows of the fluid through the orifice passage 96 between the both chambers 90, 92. Thus, the engine mount 10 can exhibit an excellent damping effect based on resonance of the fluid flowing through the orifice passage 96.

When a vibrational load is applied to the engine mount 10 in the axis-perpendicular direction or the diametric perpendicular to the axial direction, on the other hand, the fluid within the pressure-receiving chamber 90 may be forced to flow through a fluid passage formed in the annular region 98. Since a cross sectional area of the fluid passage formed in the annular region 98 is effectively restricted or reduced by the restricting projections 84, 84 disposed in the annular region 98, a resonance frequency of the fluid flowing through the annular region 98 can be reduced or shifted to a lower frequency range which does not matter in terms of a vibration-damping capability of the engine mount 10. Described more specifically, the engine mount 10 can eliminate or moderate a problem of considerable increase in a dynamic spring constant thereof at a specific frequency range, e.g., a frequency range corresponding to acceleration noises of the vehicle or the like. It should be appreciated that the restricting projections 84, 84 are arranged to be mutually opposed in the lateral direction of the vehicle that is perpendicular to the driving direction of the vehicle in which the engine mount 10 is susceptible to vibrations applied thereto in the diametric direction. When the engine mount 10 is subjected to vibrations applied thereto in the vehicle driving direction, fluid flow in the annular region 98 may be more likely excited in areas mutually opposed in the vehicle lateral direction. Therefore, the restricting projections 84, 84 disposed in this mutually opposed areas of the annular region 98 can be more effectively restrict the annular region 98.

According to the present embodiment, furthermore, the pair of restricting projections 84, 84 are arranged to be spaced away at their outer and inner circumferential surfaces 83, 85 from the elastic body 16 and the outer cylindrical member 14 both cooperating to define an inner surface of the pressure-receiving chamber 90, and to be separated from each other with a circumferential length smaller than a half of the circumference of the metallic partition member 50. In addition, since the wall thickness of each restricting projection 84 is gradually reduced as it goes to the distal end portion, the restricting projections 84 is more readily elastically deformable when flows of the fluid are induced in the annular region 98 of the pressure-receiving chamber 90, due to the pressure of the flowing fluid. As a result, a resonance system in association with the elastic deformation of the restricting projections 84, 84 are generated, making it possible for the engine mount 10 to actively exhibit a low dynamic spring constant with the help of the elastic deformation of the restricting projections 84, 84.

The spring characteristics of the restricting projections 84, 84 may be suitable adjusted so that the engine mount 10 can exhibit a desired low damping effect based on elastic deformation of the restricting projections 84, 84 or the like, with respect to a suitable frequency range of vibration that is to be damped. For instance, while the engine mount 10 may suffer from a problem of considerable increase in its dynamic spring constant in a specific frequency range due to an anti-resonance effect of fluid flowing through the annular region 98, this problem can effectively be solved by utilizing the lower dynamic spring constant of the engine mount 10 due to elastic deformation of the restricting projections 84, 84.

Moreover, the restricting projections 84, 84 are formed separately from the elastic body 16 and fixed to the metallic partition member 50, so as not to interfere with the elastic body 16. This arrangement ensures the engine mount 10 not to be adversely influenced or deteriorated in terms of its essential damping characteristics based on the elastic body 16 by the provision of the restricting projection 84, and ensures an improved efficiency in assembling components of the engine mount 10. Further, since the restricting projections 84 are independent of the elastic body 16, the restricting projections 84 can be designed with a high degree of freedom in terms of materials, spring characteristics and the like thereof, without being limited by a desired spring stiffness and a required anti environmental capacity of the vibration damping mount 16.

In the present embodiment, the elastic rubber plate 68 bonded to the metallic partition member 50 is disposed between the pressure-receiving chamber 90 and the equilibrium chamber 92. When vibrations applied to the engine mount 10 in its axial direction extends over a higher frequency range in which a resistance to flow of the fluid through the orifice passage 96 is too increased to permit the flow of the fluid therethrough, a fluid pressure variation in the pressure-receiving chamber 90 can be reduced or absorbed owing to the elastic deformation of the elastic rubber plate 68, making it possible to prevent the considerable increase of the dynamic spring constant. Thus, the engine mount 10 can exhibit an excellent damping effect with the help of the elastic rubber plate 68. Described more specifically, the orifice passage 96 may be tuned with respect to the low frequency vibrations corresponding to engine shakes so that the engine mount 10 can exhibit high vibration-damping effect based on resonance of the fluid flowing through the orifice passage 96. Also, the elastic rubber plate 68 may be suitably tuned with respect to the high frequency vibrations corresponding to booming noises so that the engine mount 10 can exhibit an excellent vibration isolating effect based on the elastic deformation of the elastic rubber plate 68 so as to absorb the fluid pressure variation in the pressure-receiving chamber 90.

These elastic rubber plate 68 and the restricting projection 84, 84 are integrally formed and bonded to the metallic partition member 50 in the above-described vulcanization process of the rubber material, making it possible to easily form both of the elastic rubber plate 68 and the restricting projection 84. Thus, the engine mount 10 constructed according to the present embodiment can be manufactured with improved efficiency, and can be made simple in construction.

In the present embodiment, the elastic body 16 is formed with the pair of recesses 48, 48 so that the spring characteristics of the elastic body 16 is made smaller in the longitudinal direction of the vehicle in which the recesses 48, 48 are opposed to each other. This low spring characteristics of the elastic body 16 in the longitudinal direction of the vehicle cooperate with the lower dynamic spring characteristics of the engine mount 10 due to the restricting projection 84 to ensure the low spring characteristics of the engine mount 10 in the axis-perpendicular direction conforming to the longitudinal direction of the vehicle.

Three examples 1, 2 and 3 of the engine mount constructed according to the present embodiment were prepared, while being varied in the angular length of the pair of restricting projections 84, 84 thereof. Namely, the angular lengths θ in the Examples 1, 2 and 3 were set to θ=60 degrees, 90 degrees, and 110 degrees, respectively. Vibration damping performances of these examples were actually measured. The obtained measurements are demonstrated in the graphs of FIGS. 10–12, respectively. Comparative examples 1 and 2 of the engine mount were also prepared. The comparative example 1 has a conventional structure wherein no restricting projection 84 is provided as shown in FIG. 15. The comparative example 2 has a conventional structure wherein is provided a single restricting projection 84 of C-letter shape in transverse cross section, which extend continuously in the circumferential direction, except a circumferential position where the communication hole 76 for connecting the orifice passage 96 to the pressure-receiving chamber 90 is formed. Vibration damping performances of the comparative examples 1 and 2 were actually measured in the same manner, and the obtained measurements are demonstrated in the graph of FIGS. 13 and 14, respectively.

In order to uniform measurement conditions, the examples 1–3 and the comparative examples 4 and 5 were made similar in overall size and constructions of the elastic body 16, the orifice passage 96 and other elements, except the restricting projections 84. A vibration damping performance of each example was examined by measuring each example in terms of a absolute dynamic spring constant and phase over a suitable frequency range, when each example was subjected to vibrational load of 49.0 m/s² applied thereto in an axis-perpendicular direction conforming a vehicle driving direction or the vertical direction as seen in FIG. 6.

Figure 10:
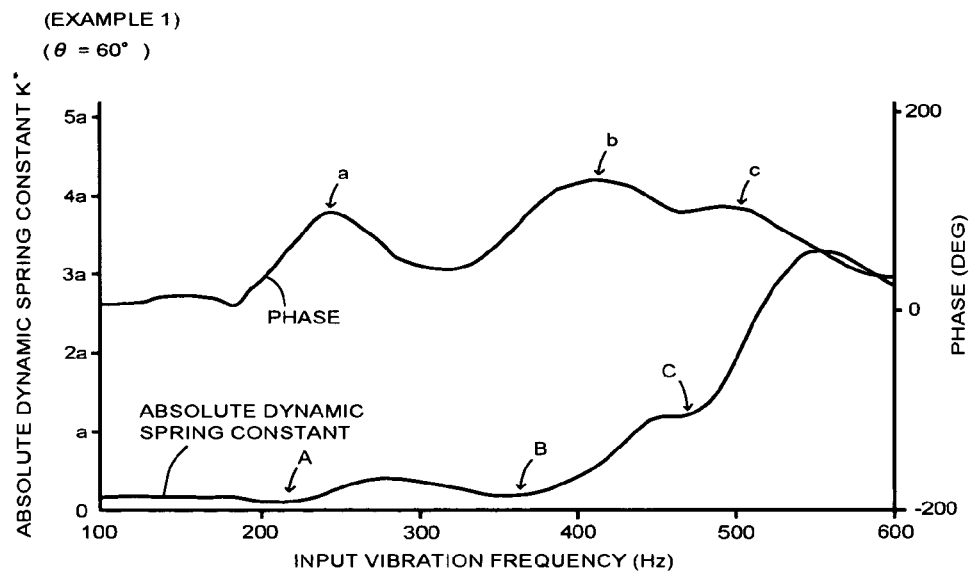
FIG. 10 is a graph showing vibration-damping performance of a first example of the engine mount constructed according to the present invention, with respect to vibrational loads applied thereto in an axis-perpendicular direction.
Figure 11:
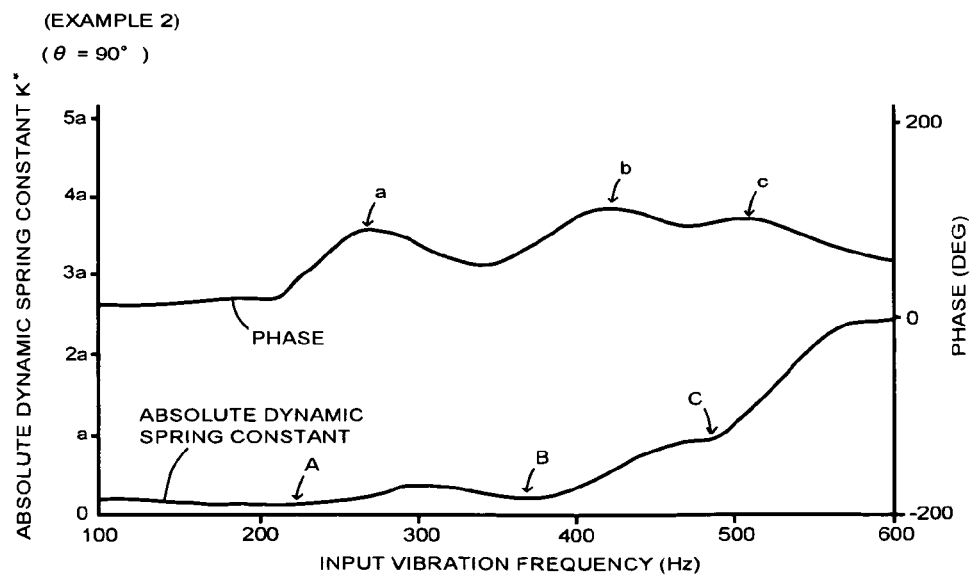
FIG. 11 is a graph showing vibration-damping performance of a second example of the engine mount constructed according to the present invention, with respect to vibrational loads applied thereto in an axis-perpendicular direction.
Figure 12:
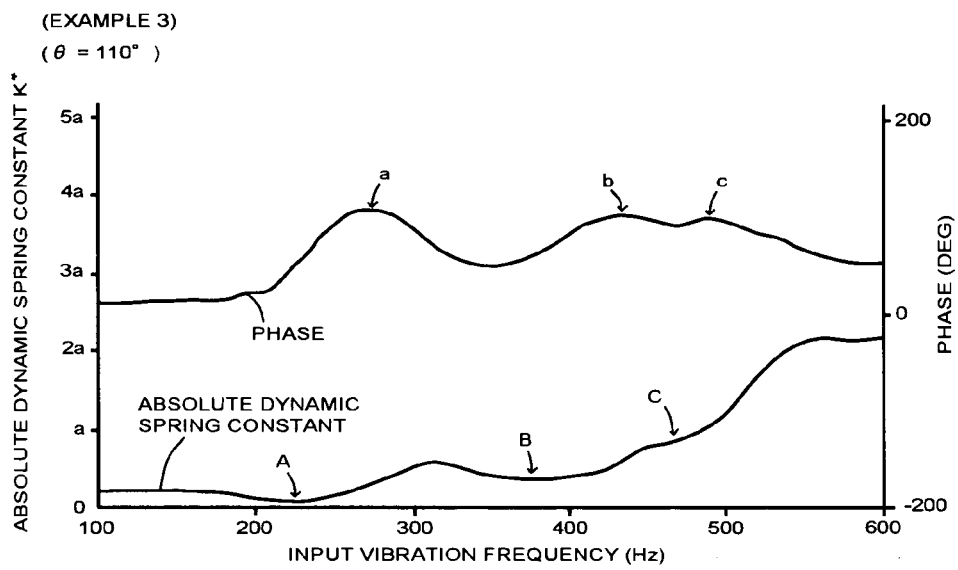
FIG. 12 is a graph showing vibration-damping performance of a third example of the engine mount constructed according to the present invention, with respect to vibrational loads applied thereto in an axis-perpendicular direction.

As is understood from the graph of FIGS. 10–12, every example 1–3 experiences a resonance phenomenon that may be based on resonance effect of the fluid flowing through the annular region 98 at a frequency range as indicated by "a" in the graphs, and exhibits a low dynamic spring constant based on the resonance effect of the fluid flowing through the annular region 98 at a frequency range as indicated by "A" in the graph. On the other hand, every example 1–3 experiences a resonance phenomenon that may be based on resonance effect of a vibration system in association with elastic deformation of the restricting projections 84, 84 at a frequency range as indicated by "b" in the graphs, and exhibits a low dynamic spring constant based on the resonance effect of the vibration system at a frequency range as indicated by "B" in the graphs.

With the help of the effect of the low dynamic spring constant in association with the elastic deformation of the pair of restricting projections 84, 84, effectively prevented or minimized is a phenomenon of a high dynamic spring constant of the engine mount at the higher frequency range of about 300 Hz–500 Hz based on anti-resonance effect of the fluid flowing through the annular region 98. Thus, it is understood from the graphs of FIGS. 10–12, the examples 1–3 of the engine mount constructed according to the present invention can exhibit excellent damping performance based on the phenomenon of low dynamic spring constant over a wide frequency range. It is also understood from the graphs of FIGS. 10–12 that the smaller the angular length (a value of θ) of each restricting projection 84, the easier in elastic deformation of each restricting projection 84. Accordingly, the frequency range "b" of the resonance phenomenon that may be based on elastic resonance of the restricting projections 84 is shifted to the lower frequency range, whereby the engine mount can exhibit a further enhanced low dynamic spring constant at the frequency range of "B".

Figure 13:
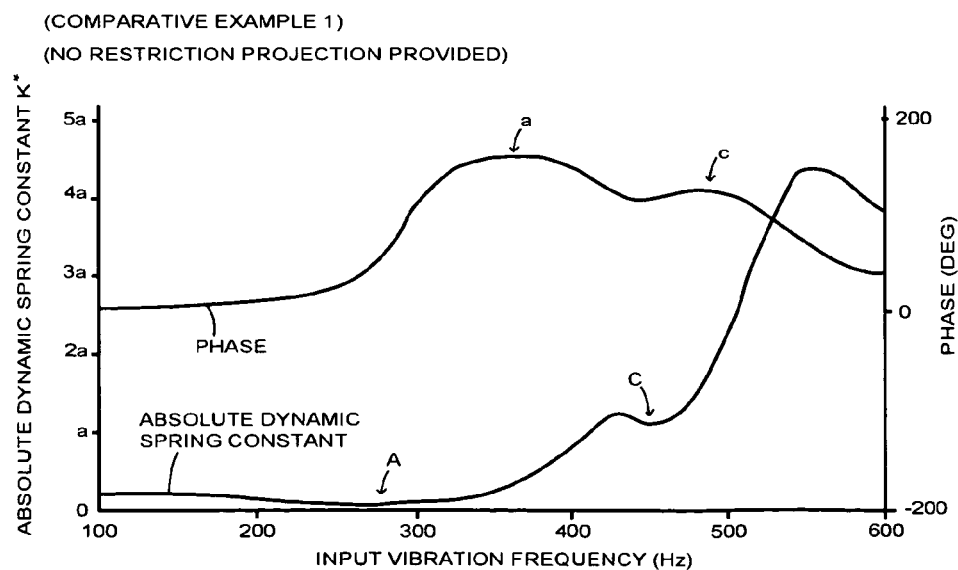
FIG. 13 is a graph showing vibration-damping performance of a first comparative example of an engine mount, with respect to vibrational loads applied thereto in an axis-perpendicular direction.

On the other hand, the graph of FIG. 13 reveals that the comparative example 1 of the engine mount having no restricting projection 84 exhibits a considerably low damping performance at a higher frequency range of not smaller than 300 Hz due to a phenomenon of considerably high dynamic spring constant as a result of anti-resonance effect of fluid flows through the annular region 98. In the graph of FIG. 13, a resonance frequency range "c" is appear at a frequency range of about 450–500 Hz, and a low dynamic spring constant area "C" may be induced based on a single resonance system of the elastic rubber layer 68 elastically displaced. This phenomenon can be found in the graphs of FIGS. 10–12, as well. However, a superiority in damping performance of the examples 1–3 of the present invention in comparison with the comparative example 1 is apparent from these graphs.

Figure 14:
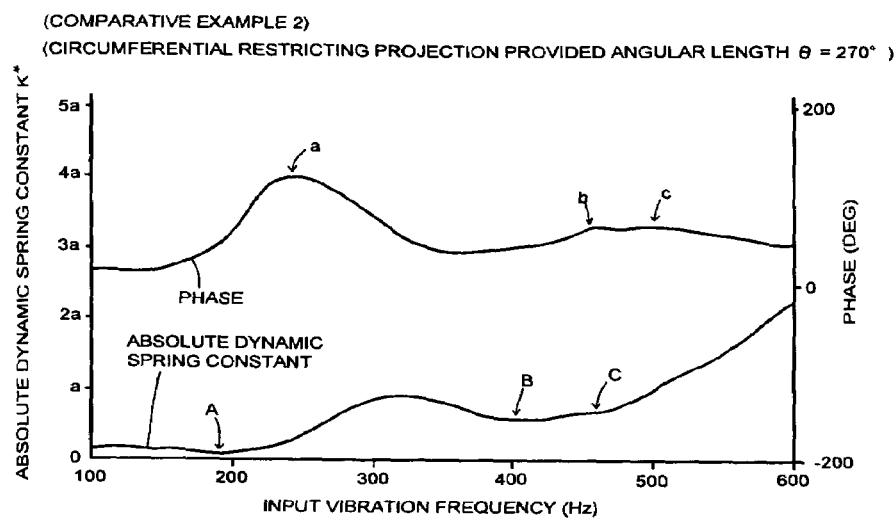
FIG. 14 is a graph showing vibration-damping performance of a second comparative example of an engine mount, with respect to vibrational loads applied thereto in an axis-perpendicular direction.
Figure 15:
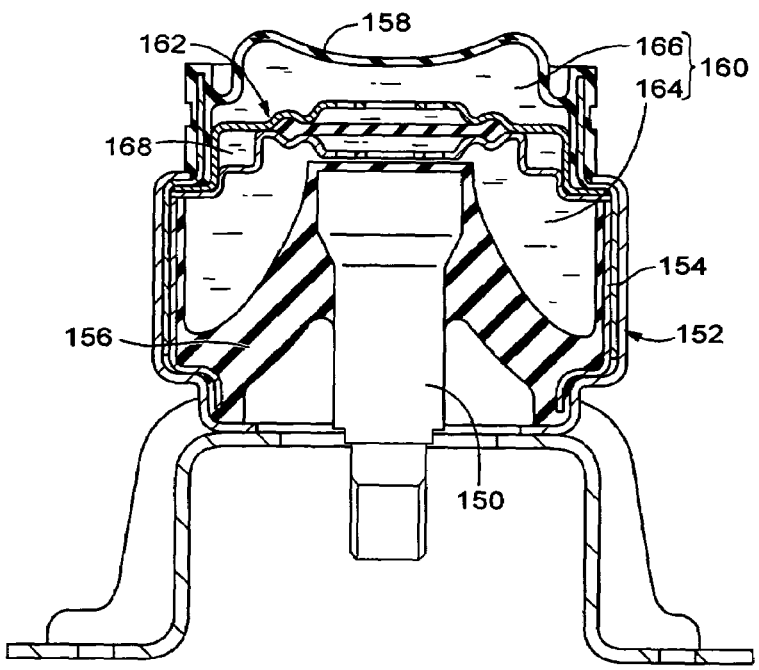
FIG. 15 is an elevational view in axial or vertical cross section of an engine mount of conventional structure.

The graph of FIG. 14 reveals that the comparative example 2 of the engine mount having the single restricting projections continuously extending circumferentially with the C-letter shape, exhibits the resonance region "b" and the low dynamic spring region "B" like in the examples 1–3 of the present invention. However, the comparative example 2 is still insufficient to exhibit a greatly effective low dynamic spring constant as do in the examples 1–3. With this regards, the minimum value (a bottom value) of the absolute dynamic spring constant at the low dynamic spring region "B" that may be caused by the elastic resonance like effect of the restricting projection 84 was measured with respect to the comparative example 2 and all examples 1–3. The obtained measurements were 100 for the comparative example 2, approximately 30 for the example 1, approximately 43 for the example 2 and approximately 61 for the example 3. This reveals that the use of the pair of restricting projections 84, 84 spaced away from each other in the circumferential direction is most effective in exhibiting a low dynamic spring constant of the engine mount.

While the presently preferred embodiment of this invention has been described in detail for the illustrative purpose only, it is to be understood that the present invention is not limited to the details of the illustrated embodiment. It is also to be understood that the present invention may be embodied with various changes, modifications and improvements which may occur to those skilled in the art, without departing from the spirit and scope of the invention.

For instance, the elastic abutting fin 89 of each restricting projection 84 is not essential to practice the invention. If the abutting fin 89 is needed, the fin 89 may be formed integrally with the elastic body 16, rather than the restricting projection 84, such that the abutting fin 89 projects from the tapered outer circumferential surface of the elastic body 16 toward the restricting projection 84.

The elastic rubber plate 68 is disposed in the through hole 66 of the metallic partition member 50 in the illustrated engine mount 10. However, such an elastic rubber plate 68 may be employed as needed taking into account a required damping performance of the engine mount or the like, but not is an essential element.

The shapes and sizes of the restricting projections are not limited to those in the illustrated embodiment, but may be suitably designed depending on required damping characteristics, a shape and size of the annular region 98.

In the illustrated embodiments, the abutting fins are arranged to be held in contact with the elastic body 16 when the engine mount is subjected to no external load (i.e., in a non installation state), and to be moved away from the elastic body 16 and/or the restricting projection, when the engine mount is subjected to a static load (i.e., in an installation state). The present invention is not limited to this arrangement. The abutting condition of the abutting fins with respect to the elastic body and/or the restricting projection may be suitably determined by those skilled in the art giving overall consideration to required damping characteristics of the engine mount and the like. For instance, the abutting fins may be arranged to be moved away from the elastic body and/or the restricting projection in the non installation state of the engine mount, and to be moved closer or in contact with the elastic body and/or the restricting projection in the installation state of the engine mount. For instance, the elastic abutting fin 89 may be arranged to be spaced away from the elastic body 16 during a state where no external load is applied to the mount.

While the illustrated embodiment of the invention takes the form of a fluid-filled engine mount for an automotive vehicle, it is to be understood that the principle of the invention is equally applicable to body mounts for automotive vehicles, and the other suspension-type fluid-filled vibration damping mounts for various machines and other equipment other than automotive vehicles.

While not enumerated herein, it should be understood that the present invention may be embodied with various other changes, modifications, and improvement which may occur to those skilled in the art, without departing from the spirit and scope of the invention defined in the following claims.

What is claimed is:

1. A fluid-filled vibration damping mount of suspension type, comprising:
    a first mounting member;
    a second mounting member having a generally hollow cylindrical configuration whose lower open end portion is situated about the first mounting member,
    a generally tapered elastic body elastically connecting the first and second mounting members together, the elastic body extending from the lower open end portion of the second mounting member to an inside of the second mounting member, and fluid-tightly closing the lower open-end portion of the second mounting member;
    a flexible layer fluid-tightly closing an upper open-end portion of the second mounting member for forming a fluid chamber defined between the elastic body and the flexible layer and filled with a non-compressible fluid;
    a partition member disposed within the fluid chamber so as to extend in an axis-perpendicular direction of the second mounting member, and fixedly supported at an peripheral portion thereof by the second mounting member, for fluid-tightly dividing the fluid chamber into a pressure-receiving chamber partially defined by the generally tapered elastic body and an equilibrium chamber partially defined by the flexible layer;
    an orifice passage for permitting a fluid communication between the pressure-receiving chamber and the equilibrium chamber; and
    a pair of restricting projections each being bonded to the partition member and projecting from the partition member into the pressure-receiving chamber so as to be situated in a region defined by and between an outer circumferential surface of the elastic body and an inner circumferential surface of the second mounting member for restricting the region, the pair of restricting projections being situated at respective circumferential positions mutually opposed in the axis-perpendicular direction of the second mounting member, and extending substantially circumferentially with a circumferential length smaller than a half of a circumference of the partition member,
    wherein the pair of restricting projections are arranged to be spaced away from the elastic body and the second mounting member, and
    wherein each of the restricting projections has an angular length smaller than 180 degrees about a center axis of the second mounting member.

2. A fluid-filled vibration damping mount according to claim 1, wherein each of the restricting projections has a width dimension varying in a height direction thereof so that the width dimension as measured in a distal end portion is smaller than that in a proximal end portion.

3. A fluid-filled vibration damping mount according to claim 1, wherein the angular length of each of the restricting projection is held within a range of 30–120 degrees about the center axis of the second mounting member.

4. A fluid-filled vibration damping mount according to claim 1, wherein the pair of restricting projections are formed substantially equally in configuration and size.

5. A fluid-filled vibration damping mount according to claim 1, wherein the partition member includes a through hole formed through a central portion thereof wherein the through hole is fluid-tightly closed by a partition rubber plate so that a fluid pressure in the pressure receiving chamber and a fluid pressure in the equilibrium chamber are exerted on an upper and lower faces of the partition rubber plate, respectively, and wherein the pair of restricting projections and the partition rubber plate are integrally formed with each other.

6. A fluid-filled vibration damping mount according to claim 1, further comprising at least one abutting fin integrally formed with the elastic body and/or the second mounting member, the at least one abutting fin projecting from at least one of opposing faces of the elastic body and the second mounting member toward an other one of the opposing faces so that the at least one abutting fin further restrict the region defined between the opposing surfaces at at least one circumferential position, when a suspending load is exerted between the first and second mounting member.

7. A fluid-filled vibration damping mount according to claim 1, wherein an outer peripheral portion of the flexible layer is bonded to an annular fixing ring that is superposed on an outer peripheral portion of the partition member, the fixing ring and the partition member being firmly fixed at the outer peripheral portions thereof to an upper open end portion of the second mounting member by caulking, while cooperating to each other to define therebetween the orifice passage extending in the outer peripheral portion of the partition member.

8. A fluid-filled vibration damping mount according to claim 1, wherein each of the restricting projection has an outer circumferential surface extending generally straightly in the axial direction over an entire area thereof, while being spaced away from the inner circumferential surface of the second mounting member with a substantially constant spacing therebetween, and the inner circumferential surface of each restricting projection extends generally straightly in the axial direction from a proximal end portion to an intermediate portion thereof, and extends slanting diametrically outwardly from the intermediate portion to a distal end portion thereof so as to be spaced away from the outer circumferential surface with a substantially constant spacing therebetween.

9. A fluid-filled vibration damping mount according to claim 1, wherein the elastic body has a wall thickness dimension varying in the circumferential direction thereof such that a pair of thin-walled portion are opposed in a first diametric direction with the first mounting member interposed therebetween, and a pair of thick-walled portion are opposed in a second diametric direction perpendicular to the first diametric direction, wherein the axis-perpendicular direction in which the pair of restricting projections are mutually opposed is arranged to substantially conform to the second diametric direction, and wherein the vibration damping mount is usable as an engine mount by installing on a vehicle such that the second diametric direction in which the thick-walled portions are mutually opposed is oriented to a lateral direction of the vehicle, and the first diametric direction in which the thin-walled portions are mutually opposed is oriented to a longitudinal direction of the vehicle.

10. A fluid-filled vibration damping mount of suspension type, comprising:

a first mounting member;

a second mounting member having a generally hollow cylindrical configuration whose lower open end portion is situated about the first mounting member, a generally tapered elastic body elastically connecting the first and second mounting members together, the elastic body extending from the lower open end portion of the second mounting member to an inside of the second mounting member, and fluid-tightly closing the lower open-end portion of the second mounting member;

a flexible layer fluid-tightly closing an upper open-end portion of the second mounting member for forming a fluid chamber defined between the elastic body and the flexible layer and filled with a non-compressible fluid;

a partition member disposed within the fluid chamber so as to extend in an axis-perpendicular direction of the second mounting member, and fixedly supported at an peripheral portion thereof by the second mounting member, for fluid-tightly dividing the fluid chamber into a pressure-receiving chamber partially defined by the generally tapered elastic body and an equilibrium chamber partially defined by the flexible layer;

an orifice passage for permitting a fluid communication between the pressure-receiving chamber and the equilibrium chamber; and a pair of restricting projections each being bonded to the partition member and projecting from the partition member into the pressure-receiving chamber so as to be situated in a region defined by and between an outer circumferential surface of the elastic body and an inner circumferential surface of the second mounting member for restricting the region, the pair of restricting projections being situated at respective circumferential positions mutually opposed in the axis-perpendicular direction of the second mounting member, and extending substantially circumferentially with a circumferential length smaller than a half of a circumference of the partition member, wherein the pair of restricting projections are arranged to be spaced away from the elastic body and the second mounting member, and wherein the partition member includes a communication hole formed therethrough that is situated between mutually opposite circumferential end faces of the pair of restricting projections for connecting the orifice passage to the pressure receiving chamber.

11. A fluid-filled vibration damping mount of suspension type, comprising:

a first mounting member;

a second mounting member having a generally hollow cylindrical configuration whose lower open end portion is situated about the first mounting member, a generally tapered elastic body elastically connecting the first and second mounting members together, the elastic body extending from the lower open end portion of the second mounting member to an inside of the second mounting member, and fluid-tightly closing the lower open-end portion of the second mounting member;

a flexible layer fluid-tightly closing an upper open-end portion of the second mounting member for forming a fluid chamber defined between the elastic body and the flexible layer and filled with a non-compressible fluid;

a partition member disposed within the fluid chamber so as to extend in an axis-perpendicular direction of the second mounting member, and fixedly supported at an peripheral portion thereof by the second mounting member, for fluid-tightly dividing the fluid chamber into a pressure-receiving chamber partially defined by the generally tapered elastic body and an equilibrium chamber partially defined by the flexible layer;

an orifice passage for permitting a fluid communication between the pressure-receiving chamber and the equilibrium chamber; and a pair of restricting projections each being bonded to the partition member and projecting from the partition member into the pressure-receiving chamber so as to be situated in a region defined by and between an outer circumferential surface of the elastic body and an inner circumferential surface of the second mounting member for restricting the region, the pair of restricting projections being situated at respective circumferential positions mutually opposed in the axis-perpendicular direction of the second mounting member, and extending substantially circumferentially with a circumferential length smaller than a half of a circumference of the partition member, wherein the pair of restricting projections are arranged to be spaced away from the elastic body and the second mounting member, and wherein the pair of restricting projections are arranged in configuration, size and/or material so that the mount exhibits a low dynamic spring constant due to resonance of the fluid flowing circumferentially within the pressure receiving chamber, with respect to vibrations of frequency within a range of 150–300 Hz, and exhibits a low dynamic spring constant due to elastic resonance of the pair of restricting projections with respect to vibrations of frequency within a range of 300–500 Hz.

* * * * *